(12) United States Patent
Russell et al.

(10) Patent No.: US 8,331,348 B2
(45) Date of Patent: Dec. 11, 2012

(54) METHOD AND SYSTEM FOR PROVIDING SIGNALING GATEWAY MANAGEMENT

(75) Inventors: James N. Russell, Tulsa, OK (US); Roy C. Shell, Owasso, OK (US); Ian C. Scott, Owasso, OK (US); Kenny M. Hawkins, Tulsa, OK (US); Bob E. Taylor, Owasso, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 526 days.

(21) Appl. No.: 12/610,814

(22) Filed: Nov. 2, 2009

(65) Prior Publication Data

US 2011/0103371 A1    May 5, 2011

(51) Int. Cl.
*H04L 12/28* (2006.01)

(52) U.S. Cl. ........................................ 370/351

(58) Field of Classification Search ............... 370/351, 370/352, 356
See application file for complete search history.

(56) References Cited

U.S. PATENT DOCUMENTS

| 7,324,502 B2 * | 1/2008 | Sheldon et al. ............ 370/352 |
| 2003/0179742 A1 * | 9/2003 | Ogier et al. ................ 370/351 |
| 2008/0043729 A1 * | 2/2008 | Wei ............................ 370/356 |
| 2008/0062885 A1 * | 3/2008 | Moon et al. ................ 370/244 |

* cited by examiner

*Primary Examiner* — Fan Ng

(57) ABSTRACT

An approach is provided for signaling gateway management. Data from a plurality of signaling gateways corresponding to a plurality of trunks of a telecommunications network is automatically retrieved, each signaling gateway being configured to convert circuit-switched signaling to packet-switched signaling. The data is stored. An operating state for each of the plurality of trunks is determined based on the data to perform trending analysis for the operation of one or more of the plurality of trunks.

8 Claims, 10 Drawing Sheets

FIG. 8

| SIGNALING GATEWAY IDENTIFIER | STATE | VSPAN IDENTIFIER | POINT CODE | TRUNKING GATEWAY IDENTIFIER | TRUNK IDENTIFIER | CIRCUIT IDENTIFIER | CIC START |
|---|---|---|---|---|---|---|---|
| CHIC | NEW | 174 | 1-143-103 | AN1IND20 | EDNIPLUINJGDS0 | SF-O69-069-0197 | 4201 |
| CHIC | NEW | 175 | 1-143-103 | AN1IND20 | EDNIPLUINJGDS0 | SF-O69-069-0198 | 4225 |
| ... | ... | ... | ... | ... | ... | ... | ... |
| CHIC | NEW | 188 | 1-143-103 | AN1IND20 | EDNIPLUINJGDS0 | SF-O69-069-0211 | 4549 |

| VSPAN IDENTIFIER | STATE | TREND |
|---|---|---|
| 190 | NEW | WAITED FOR 5235 SECONDS FOR RESET TO COMPLETE |
| 191 | NEW | WAITED FOR 5235 SECONDS FOR RESET TO COMPLETE |
| ... | STAGED | ... |
| ... | STAGED | ... |
| ... | ONLINE | |
| 229 | DOWN HARD | WAITING FOR ACCESS GATEWAY UP |

| SIGNALING GATEWAY IDENTIFIER | ORDERED PAIR | CONFIGURATION DIFFERENCES |
|---|---|---|
| WASHINGTON_A | WASHINGTON_B | CREATE-RSET:ROUTESET=BTHSMDWADS0,DPC=246-193-99,ROUTES=CLSET1... |
| WASHINGTON_B | WASHINGTON_A | CREATE-RSET:ROUTESET=WASHDCSWDSA,DPC=246-193-11,ROUTES=CLSET1... |
| ... | ... | ... |
| CITY "N" | CITY "N-1" | CONFIGURATION DIFFERENCES "N" |

| POINT CODE | VSPAN | CIRCUIT IDENTIFIER | BLOCKING STATE |
|---|---|---|---|
| 1-175-38 | 3311 | 01417 | LOCAL MAINTENANCE, REMOTE HARDWARE |
| 1-175-38 | 3312 | 01438 | REMOTE HARDWARE |
| 1-175-38 | 3316 | 01542 | LOCAL MAINTENANCE, REMOTE MAINTENANCE |
| 1-175-38 | 3329 | 01865 | LOCAL HARDWARE |
| ... | ... | ... | ... |
| 1-176-40 | 0215 | 06175 | REMOTE MAINTENANCE |

1101 / 1103 / 1105 / 1107

1100

METHOD AND SYSTEM FOR PROVIDING SIGNALING GATEWAY MANAGEMENT

BACKGROUND INFORMATION

Modern communication networks are growing in size and complexity. Unfortunately, as the number of consumers increase and the sophistication of services continue to evolve, the performance of these networks tend to degrade, in part, from link and pathway congestion. As such, network service providers (or carriers) enabling communications over, for instance, circuit-switched networks (such as the public switched telephone network (PSTN), integrated services digital networks (ISDN), etc.) are seeking higher-quality, more performance rich, and better scaling alternatives to off-load the increasing amount of user traffic from these circuit-switched networks onto, for example, packet-switched networks. This has given rise to an emergence of gateway technologies providing interfaces between circuit-switched and packet-switched networks that are capable of interworking between various transmission protocols and corresponding technologies of these networks so that intermediary transmissions can occur over at least one packet-switched network. Along with this mode of network traffic management comes a new burden to provision and ensure reliable service over converged infrastructures, i.e., service that is capable of withstanding link and node failure, as well as maintaining high transmission capacity and quality of service. In fact, the highly competitive nature of the telecommunications industry has caused network service providers to rely, more than ever, on network availability, resilience, and reliability as key differentiators to delivering voice, data, and video services. Namely, the impact of network failures (whether soft or hard), even if for a short duration, can result in substantial losses. Thus, the ability to efficiently manage, e.g., configure, monitor, evaluate, and adapt, the performance of these signaling gateways is becoming a critical business component for network service providers. Conventional approaches, however, have proven inadequate, especially across large, complex infrastructures.

Therefore, there is a need for an approach that can efficiently and effectively provide signaling gateway management.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 8-12 are illustrative signaling gateway management reports, according to exemplary embodiments.

DESCRIPTION OF THE PREFERRED EMBODIMENT

A preferred apparatus, method, and software for providing signaling gateway management are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to signaling system 7 (SS7) common channel signaling networks, protocols, and related technologies, it is contemplated that various exemplary embodiments are also applicable to other similar or equivalent infrastructures, technologies, and protocols.

Figure 1:
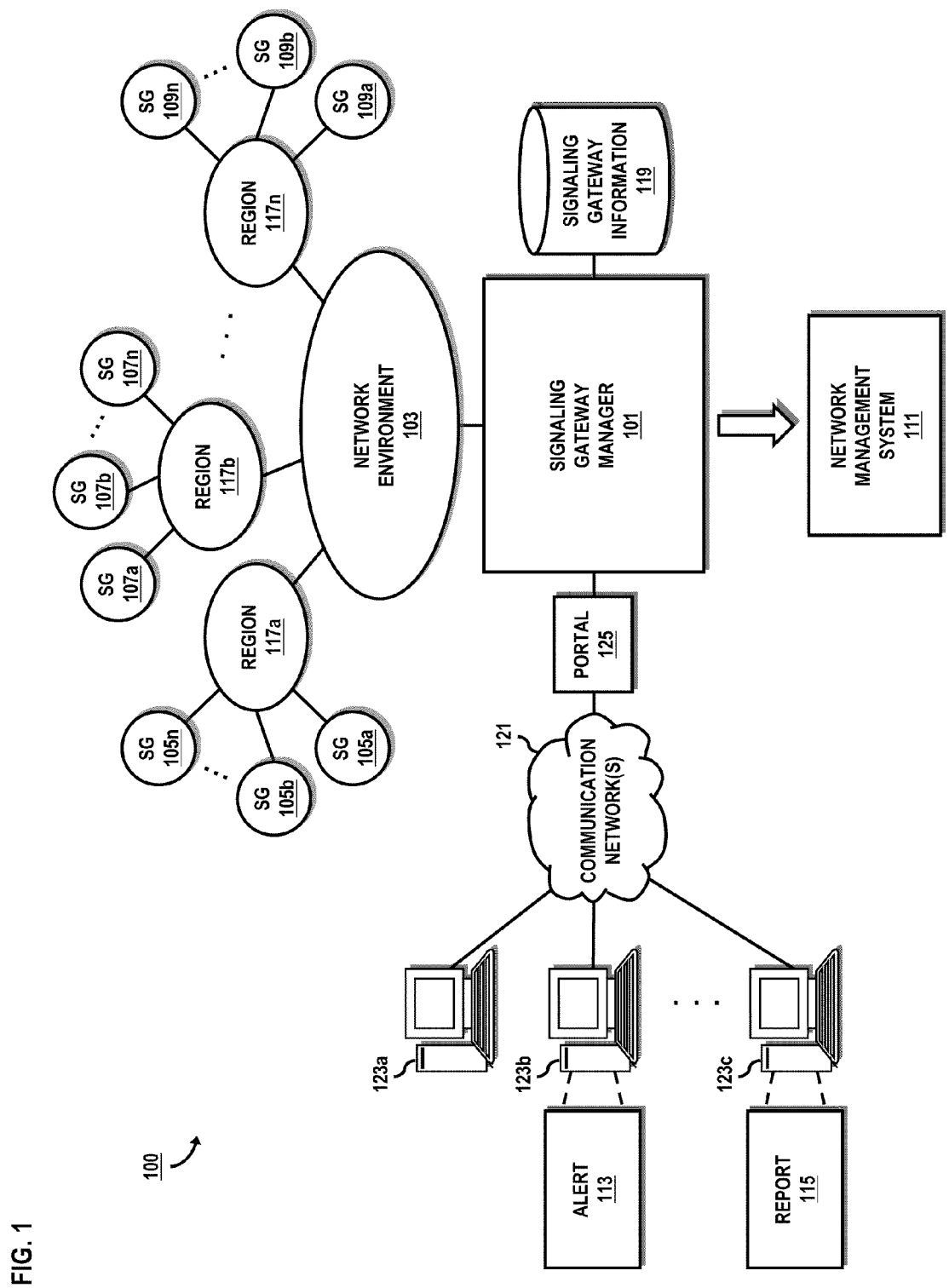
FIG. 1 is a diagram of a system configured to provide signaling gateway management, according to an exemplary embodiment.

FIG. 1 is a diagram of a system configured to provide signaling gateway management, according to an exemplary embodiment. For the purposes of illustration, system 100 is described with respect to signaling gateway manager (or manager) 101 configured to dynamically collect and analyze signaling gateway information (or data) relating to one or more signaling gateways (SG), e.g., SGs 105a, 105b, ..., 105n, 107a, 107b, ..., 107n, 109a, 109b, ..., 109n, of network environment 103. In this manner, manager 101 may be employed to proactively identify and alert network administrators (not shown) and/or other network management systems 111 to emerging (or existing) hardware or software issues and/or various operating configurations of the components of network environment 103. Also, network administrators and management systems 111 may be provided with one or more generated alerts (e.g., alert 113) or reports (e.g., report 115). It is also noted that network environment 103 may be physically or logically divided into one or more regions, such as regions 117a, 117b, ..., 117n, which may relate to one or more geographical divisions of a "footprint" of an infrastructure of a network service provider (or carrier); however, any other suitable divisionary scheme may be utilized. By way of example, network environment 103 may correspond to a converged telecommunications infrastructure of a network service provider in support of one or more services, e.g., one or more data, voice, and/or video services. As such, it is contemplated that system 100 may embody many forms and include multiple and/or alternative components and facilities.

It is noted that network service providers are invariably presented with various infrastructure issues pertaining to the exhaustion of network resources in response to the provisioning of new customer accounts and the inauguration of new, more process intensive services. Further, as the infrastructure of a network service provider geographically expands and grows more technologically advanced, it is becoming a rather complex and onerous task to consistently and efficiently configure, monitor, evaluate and adapt these systems, especially across the footprint of a carrier.

For instance, modern telecommunication networks are migrating towards distributed infrastructures in which a first category of networking equipment configured to carry user traffic is being separated from a second category of networking equipment configured to provide control and signaling functions. These infrastructures typically enable the convergence of dissimilar networks, such as circuit-switched networks and packet-switched networks, etc., which generally employ different bearer technologies and/or signaling protocols. As such, "trunking gateways" are utilized to interwork user traffic between these dissimilar networks and, thereby, are configured to provide conversion and/or adaptation functions for transforming the bearer traffic and/or signaling protocols of one network to another. Control devices, such as "signaling gateways," are utilized to control and signal the trunking gateways in support of these conversion and/or adaption functions. In this manner, signaling gateways may communicate with trunking gateways using one or more control protocols, such as simple gateway control protocol (SGCP), media gateway control protocol (MGCP), internet protocol device control (IPDC), H.218, and/or the like. These signaling gateways are also configured to communicate with legacy circuit-switched signaling nodes using common channel control protocols, such as signaling system number 7 (SS7) ISDN user part (SS7 ISUP), session initiation protocol (SIP), H.323, bearer independent call control (BICC), etc.

Accordingly, signaling gateways may also utilize the exchange of signaling messages to gather an abundant amount of information relating to the networking environment in which the signaling gateways operate. In turn, network service providers may analyze this information to monitor and adapt the networking environment to thwart reliability issues, performance degradation issues, and the like. Unfortunately, network administrators have been limited to manual collection, correlation, and analyzing techniques. In practical terms, however, such manual processes become progressively more burdensome and impractical as the complexity and size of the networking increases. As such, signaling gateway management may be inefficiently and/or inconsistently implemented, which becomes more acute when comparing the performance of one region of a telecommunication infrastructure to another. Further, such techniques lack an objective basis that can be dynamically assessed and improved upon. To remain competitive, however, network service providers should aim to provide consistent, high quality service across their footprint, as well as continually improve upon the manner in which user traffic is offloaded and interworked between circuit-switched and packet-switched networks.

Therefore, the approach of system 100, according to certain exemplary embodiments, stems from the recognition that objective and dynamic signaling management tools capable of automated aggregation and analysis of signaling gateway information across a carrier's footprint not only enables these network service providers to efficiently access information that would otherwise be practically unavailable, but also enables the carriers to implement consistent, techniques to configure, monitor, evaluate, and optimize their networking infrastructures.

As shown, system 100 includes signaling gateway manager 101 that is configured to analyze, correlate, and trend a wealth of signaling gateway information (or data) retrieved (or received) from one or more signaling gateways (not illustrated) corresponding to a plurality of transmission paths (or trunks) of a networked environment 103. In this manner, manager 101 may be employed to analyze this signaling gateway information to proactively identify and alert network administrators and/or other network management systems 111 to emerging (or existing) hardware or software issues and/or various operating configurations of the components of network environment 103. For instance, manager 101 may utilize this signaling gateway information to determine an operating state for the trunks (not shown) of network environment 103 and perform trending analysis for the operation of one or more of these trunks. In certain embodiments, manager 101 may identify trunks with "down" operating states, trend aggregated signaling gateway information, and generate reports, based on the trends, to at least specify downtime of identified trunks.

According to particular implementations, manager 101 may also be configured to correlate identified trunks with corresponding circuit identification codes (CIC) and/or access gateway socket identifiers, which enables manager 101 to determine the operating states of the trunks at various levels of abstraction, e.g., from a trunk perspective, transmission channel perspective, and/or socket perspective. In this manner, manager 101 may generate reports 115 or alerts 113 to include the correlated CICs, socket identifiers, and simplexed states. In other instances, signaling gateway manager may utilize aggregated signaling gateway information to identify signaling gateways paired (or otherwise grouped) for redundant operation, compare the operating configuration parameters of these signaling gateways to identify potential differences, which causes incompatibility issues and can lead to loss of service. As such, manager 101 may provide identified differences to network management system 111 so that disparately configured, paired signaling gateways may be suitably reconfigured.

In certain embodiments, manager 101 may be configured to aggregate extensive directory address records, which may be stored to one or more signaling gateway information repositories 119 and, thereby, made available to network administrators to search and efficiently identify signaling gateways to which the directory addresses are provisioned. It is noted that these directory address records may be stored and/or searched in relation to one or more regions (e.g., regions 117a-117n) of network environment 103 or other suitable divisionary scheme. In other instances, manager 101 may be employed to analyze and trend memory volume statistics relating to the storage capacities of, for instance, signaling gateways 105a-105n, 107a-107n, and/or 109a-109n.

Accordingly, network environment 103 may be any network (or group of networks) through which users (such as home users, business users, and the like) communicate with various service providers and/or each other. As such, network environment 103 may include various facilities and equipment that extend from the location(s) of each user to the location(s) of each service provider in order to facilitate communications therebetween. For instance, network environment 103 may include the outside plant, the inside plant, and/or the inside wiring of a service provider. By way of example, the outside plant may include the cables, conduits, ducts, poles, and other supporting structures, as well as certain equipment items, such as load coils, repeaters, etc., of a network service provider. Namely, the outside plant includes the local loops, which are the physical connections from one or more customer premises (e.g., residential homes, commercial businesses, etc.) to the points of presence (POP) of the service provider. It is noted that the local loops may be provided over any suitable transmission medium, including twisted pair, fiber optic, coax, and the like. In this manner, a local loop of a conventional telephone system may comprise twisted pairs (or other wiring) that connect a demarcation point (e.g., a distribution frame, a cable head, etc.) of a customer premise to an edge (e.g., a circuit switch) of a local exchange carrier (LEC) central office (CO). The inside plant may include the fixtures, implements, machinery, and apparatuses used within one or more COs of the service provider, such as the switches, routers, broadband equipment, distribution frames, transmission equipment, power supply equipment, heat coil protectors, grounding systems, etc. Accordingly, the inside wiring includes the aforementioned transmission mediums as those mediums are located within a customer premise or building. The inside wiring begins at the demarcation point and extends to individual end devices. As such, network environment 103 may be geographically dispersed across numerous regions and/or other logical divisions, such as regions 117a-117n. An exemplary regional infrastructure of network environment 103 is described in more detail in association with FIG. 2.

Figure 2:
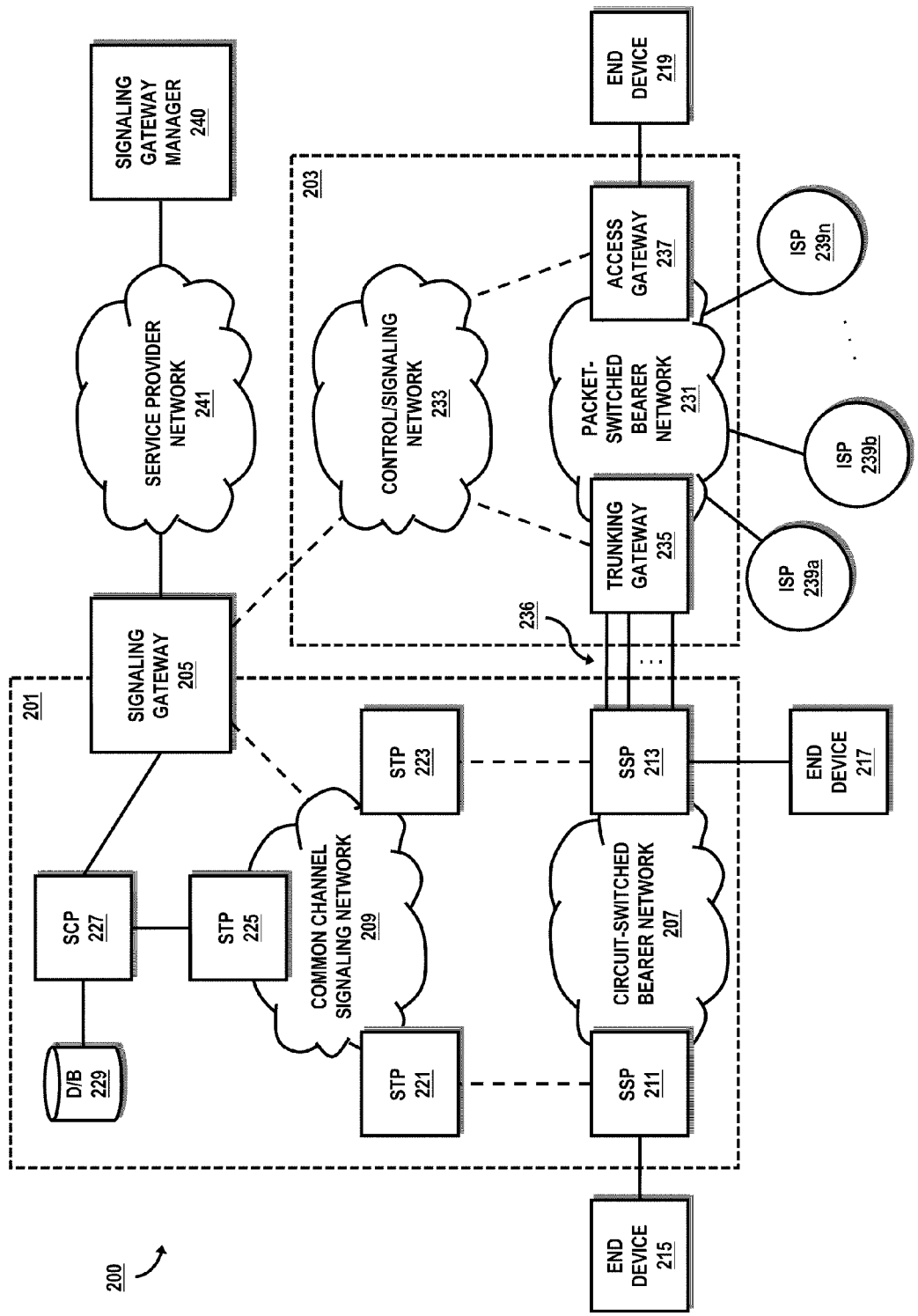
FIG. 2 is a diagram of a regional infrastructure including one or more signaling gateways, according to an exemplary embodiment.

FIG. 2 is a diagram of a regional infrastructure including one or more signaling gateways, according to an exemplary embodiment. Regional infrastructure (or region) 200 includes at least two distinct telecommunication networks, e.g., a circuit switched network 201 and a packet switched network 203, that are interworked (or otherwise interconnected) via one or more signaling gateways 205. In this example, circuit-switched network 201 may be configured to employ suitable multiplexing techniques or transmission protocols, such as frequency division multiplexing (FDM), time division multiplexing (TDM), wavelength division multiplexing (WDM), and the like, whereas packet-switched network 203 may utilize suitable transmission protocols, such as internet protocol (IP), asynchronous transfer mode (ATM), frame relay, etc.

According to exemplary embodiments, circuit-switched network 201 includes a circuit-switched bearer network 207 and a common channel signaling network 209. Circuit-switched bearer network 207 includes various switching nodes, such as one or more service switching points (SSP), e.g., SSPs 211 and 213, that are interconnected via one or more trunks (or transmission channels) that are configured to transport network traffic from originating devices to terminating devices, such as end devices 215, 217, and/or 219. Common channel signaling network 209 is, for instance, an SS7 signaling network configured to facilitate control signaling between the switching nodes of circuit-switched bearer network 207, such as SSPs 211 and 213, signaling transfer points (STPs) 221, 223, and 225, and service control points (SCPs) 227. It is noted that each of the SSPs, STPs, and SCPs embodying circuit-switched network 201 may be uniquely identified by, for instance, corresponding point codes (PC), whereas the various transmission channels of the trunks of circuit-switched network 201 may be identified by, for example, corresponding circuit identification codes (CIC).

Service switching points 211 and 213 may be, for instance, class-5 type central office (CO) switches (e.g., local exchange carriers) connected to common channel signaling network 209 via STPs 221 and 223, respectively. In order to enable communications to be routed over circuit-switched bearer network 207, SSPs 211 and 213 are interconnected via one or more trunks, whereas SSPs 211 and 213 are respectively interconnected to STPs 221 and 223 via either one or more direct (e.g., associated signaling) or indirect (e.g., quasi-associated signaling) links or link sets. Intelligent or otherwise extended services may be provided by one or more SCPs 227 that maintain profile information (such as calling code information, directory address information, billing information, and the like) in one or more repositories 229. This profile information may be utilized to set up, tear down, and manage communication sessions, as well as effectuate one or more other services. Even though not illustrated, SCPs 227 may further communicate with one or more intelligent peripherals to enable voice messaging services, communication session forwarding, and the like.

Signal transfer points 221, 223, and 225 are configured to pass and/or route signaling messages between SSPs 211 and 213, other STPs (not shown), SCPs 227, and/or signaling gateways 205. Accordingly, information extracted from one or more addressing fields of these signaling messages may be utilized by SSPs 211 and 213 to route communications between corresponding endpoints. It is also noted that signaling messages may be exchanged by nodes of common channel signaling network (e.g., STPs 221, 223, and 225) to "learn" about the operating state of common channel signaling network 209, such as to ascertain the availability of adjacent or other STPs, determine bit error rates on particular signaling links, inform adjacent or other STPs that certain STPs are (or are going) out of service, etc.

Packet-switched network 203 includes packet-switched bearer network 231 and control/signaling network 233. One or more trunking (or media) gateways 235 may be configured to enable dissimilar telecommunication networks, such as circuit switched network 201 and packet-switched network 203, to be interconnected via one or more inter-machine trunks (IMT) 236 that are each configured to support one or more transmission channels. Trunking gateways 235 may be controlled by one or more signaling gateways 205 via control/signaling network 233. In this manner, trunking gateways 235 enable user traffic to be interworked onto one or more pathways (not illustrated) of packet-switched bearer network 231. These pathways may be physical and/or logical links that terminate at, for instance, one or more access gateways 237 and, thereby, at one or more sockets of the access gateways 237. Access gateways 237 provide connectivity to one or more end devices, such as end device 219. It is noted that packet-switched bearer network 231 may also provide connectivity to one or more third-party service providers, such internet service providers (ISP) 239a, 239b, . . . , 239n.

According to exemplary embodiments, signaling gateways 205 provide core communication session processing functions and, thereby, are configured to exchange signaling traffic with one or more signaling nodes (e.g., STPs 221, 223, and 235) of common channel signaling network 209 and one or more gateways (e.g., trunking gateway 235 and access gateway 237) of packet-switched bearer network 231. With respect to common channel signaling network 209, this signaling traffic may relate to, for instance, one or more SS7 ISDN user part (ISUP) or telephone user part (TUP) signaling messages. Control/signaling network 233 is, however, configured to transport signaling traffic between signaling gateway 205 and, for instance, trunking gateway 235 and/or access gateway 237 in the form of one or more packets constructed utilizing, for example, the internet protocol device control (IPDC) protocol. It is contemplated, however, that any other suitable packet-switched signaling protocol may be utilized, such as the network access server (NAS) protocol, media access gateway control protocol (MGCP), and the like. As such, a telephony call originating at end device 215 may be setup via SS7 ISUP initial address messages (IAM) and torn down via release (REL) messages, whereas a telephony call originating at end device 219 may be setup via request connection between two endpoints (RCON) messages and torn down via release channel request (RCR) messages. Accordingly, signaling gateways 205 are configured to convert between, for instance, the IAMs and RCON messages for call setup and between REL messages and RCR messages for call tear down. It is noted that ISUP messages and protocols are defined by Telecordia Technologies Specification of the Signaling System Number Seven, GR-246-CORE, Vol. 3, T1.113.1-T1.113.5, December 2001, which is incorporated, herein, by reference, in its entirety, whereas IPDC messages and protocols are defined by A. Dugan, IPDC Connection Control Protocol, Internet Engineering Task Force, August 1998, which is also incorporated, herein, by reference, in its entirety. Table 1 provides exemplary parameters of JAM, REL, RCON, and RCR messages that may be stored and aggregated by signaling gateways 205 and, thereby, made available to signaling gateway manager (or manager) 240 via, for instance, service provider network 241, e.g., a corporate network of the network service provider of networking environment 103.

TABLE 1

Call Setup and Tear Down Signaling Message Parameters

| IAM Message Parameters | REL Message Parameters | RECON Message Parameters | RCR Message Parameters |
|---|---|---|---|
| Message Type | Message Type | Command | Command |
| Nature of Connection Indicators | Cause Indicators | Host-IP Address | Host-IP Address |
| Forward Call Indicators | Redirection Information | Endpoint1 IPDC-Reference | Connection Identifier |
| Calling Party Category | Redirection Directory Address | Endpoint2 IPDC-Reference | Cause Code |
| Transmission Medium Requirement | User to User Indicators | Connection Direction | Parameter |
| Called Party Directory Address | User to User Information | Dynamic Payload Type | Command |
| Transit Network Selection | Access Transport | Session Key | Host-IP Address |
| Call Reference | Access Delivery Information | Bearer Capability | Connection Identifier |
| Calling Party Directory Address | Parameter Compatibility Information | Called Party Directory Address | Cause Code |
| Optional Forward Call Indicators | Network Specific Facility | Calling Party Directory Address | Parameter |
| Redirecting Directory Address | Signaling Point Code | Requested Priority | Command |
| Redirection Information | Automatic Congestion Level | Statistics Request | Host-IP Address |
| Closed User Group Interlock Code | Redirection Directory Address Restriction | Quality of Service | Connection Identifier |
| Connection Request | End of Optional Parameters | Event Script | Cause Code |
| Original Called Directory Address | | Script Type | Parameter |
| User to User Information | | Symbol Set | Command |
| Access Transport | | Maximum Buffer Size | Host-IP Address |
| User Service Information | | | Connection Identifier |
| User to User Indicators | | | Cause Code |
| Generic Number | | | |
| Propagation Delay Counter | | | |
| User Service Information Prime | | | |
| Network Specific Facility | | | |
| Generic Digit | | | |
| Originating Point Code | | | |
| User Service Information Prime | | | |
| Remote Operations Parameter | | | |
| Compatibility Information | | | |
| Generic Notification | | | |

TABLE 1-continued

Call Setup and Tear Down Signaling Message Parameters

| IAM Message Parameters | REL Message Parameters | RECON Message Parameters | RCR Message Parameters |
|---|---|---|---|
| Service Activation | | | |
| Generic Reference | | | |
| MLPP Precedence | | | |
| Transmission | | | |
| Medium | | | |
| Requirement Prime | | | |
| Location Directory | | | |
| Address | | | |
| End of Optional | | | |
| Parameters | | | |

As mentioned, signaling gateways 205 are configured to extract and store relevant signaling messaging parameters from exchanged signaling messages to facilitate one or more network management tasks of signaling gateway manager 101. It is noted that the signaling gateway information (or parameters) may be automatically retrieved (or received) from respective signaling gateways 205 by manager 240 via, for instance, service provider network 241. In exemplary embodiments, manager 240 stores this signaling gateway information to, for example, one or more signaling gateway information repositories, such as signaling gateway information repository 119 of system 100.

Referring back to FIG. 1, signaling gateway manager 101 may be implemented in one or more computing environments, including as a backend component (e.g., as a data server), as a middleware component (e.g., as an application server), as a front-end component (e.g., as a client computing device having, for instance, a graphical user interface (GUI) or web-browsing application through which a client computing device can interact with a data server or application server), or as any combination thereof. System 100 may be interconnected by any form or medium capable of supporting data communications, such as one or more communication networks 121, e.g., one or more local area networks (LAN), metropolitan area networks (MAN), wide area networks (WAN), the Internet, etc. Further, communication networks 121 may embody any telephony network, data network, and/or wireless network capable of transporting (or otherwise relaying) data between one or more originating points and one or more destination points. As such, system 100 may embody a client-server environment, a master-slave environment, a peer-to-peer environment, or any other suitable environment. It is noted that even though communication networks 121 and networking environment 103 are depicted as separate entities, communication networks 121 may be completely or partially contained within network environment 103. For instance, communication networks 121 may relate to one or more of the telecommunication networks described in association with FIG. 2.

As shown in FIG. 1, manager 101 is implemented as a backend data server accessible to one or more client computing devices (e.g., client computing devices 123a, 123b, . . . , 123n) via a middleware application server, i.e., portal 125. Client computing devices 123a-123n interact with portal 125 via communication network(s) 121. According to one embodiment, portal 121 acts as an enterprise web portal that provides a consistent "look and feel" for access control and signaling gateway management over the "footprint" of a carrier. Such an architecture, while not necessary, enables client computing devices 123a-123n to be remotely dispersed (e.g., as by geography) from each other, as well as from manager 101, yet remain in collaboration with manager 101. Namely, portal 125 enables intelligent integration of and unified, real-time access to the features and functionalities of manager 101. According to one embodiment, portal 125 provides one or more customized portlets (e.g., user interface components) arranged in one or more page layouts, which can be tailored to the various users and/or logical divisions (e.g., regions 117a-117n) of network environment 103. Thus, users of manager 101 can be provided with a common set of web-based, or otherwise networked, signaling gateway management applications and resources to consistently and efficiently analyze, correlate, and trend a wealth of signaling gateway information, as well as identify both hardware and software related issues.

According to one embodiment, manager 101 may also be configured to communicate with one or more other networking functions, such as network management system 111. In certain embodiments, network management system 111 may be configured to adapt and modify user traffic offloading conditions and/or signaling gateway configurations based on one or more alerts or notifications provided to network management system 121 by signaling gateway manager 101.

It is also noted that client computing devices 123a-123n may include one or more client programs (not shown) that operate thereon for presenting alerts (e.g., alert 113) and/r reports (e.g., report 115); however, it also is contemplated that these (or other) client programs may be executed via manager 101 and, thereby, made accessible to users via client computing devices 123a-123n. In one embodiment, these client programs may relate to one or more graphical user interfaces (GUI) configured to control the presentation and content of alerts 113 and/or reports 115. Further, the GUIs may be configured to facilitate the acquisitioning, exchanging, managing, sharing, storing, customizing, searching, updating, etc., of signaling gateway information stored to, for instance, signaling gateway information repository 119. In various instances, network browser applications may be provided for accessing similar applications made available by, for example, manager 101. An exemplary GUI capable of execution on client computing devices 123a-123n is described with reference to FIG. 7.

As previously mentioned, signaling gateway information received (or retrieved) from signaling gateways 105a-105n, 107a-107n, and 109a-109n may be stored to one or more signaling gateway information repositories 119. In this manner, repository 119 may be maintained by the network service provider of network environment 103 or any suitable third-party entity. It is also contemplated that the physical implementation of repository 119 may take on many forms, including, for example, portions of existing repositories of a network service provider, new repositories of a network service provider, third-party repositories, and/or shared-repositories. As such, repository 119 may be configured for communication over system 100 via any suitable messaging protocol, such as lightweight directory access protocol (LDAP), extensible markup language (XML), open database connectivity (ODBC), structured query language (SQL), and the like, as well as combinations thereof. In those instances when repository 119 is provided in one or more distributed fashions, information and/or content available via repository 119 may be located utilizing querying techniques, such as electronic number matching, distributed universal number discovery (DUNDi), uniform resource identifiers (URI), and the like.

Figure 3:
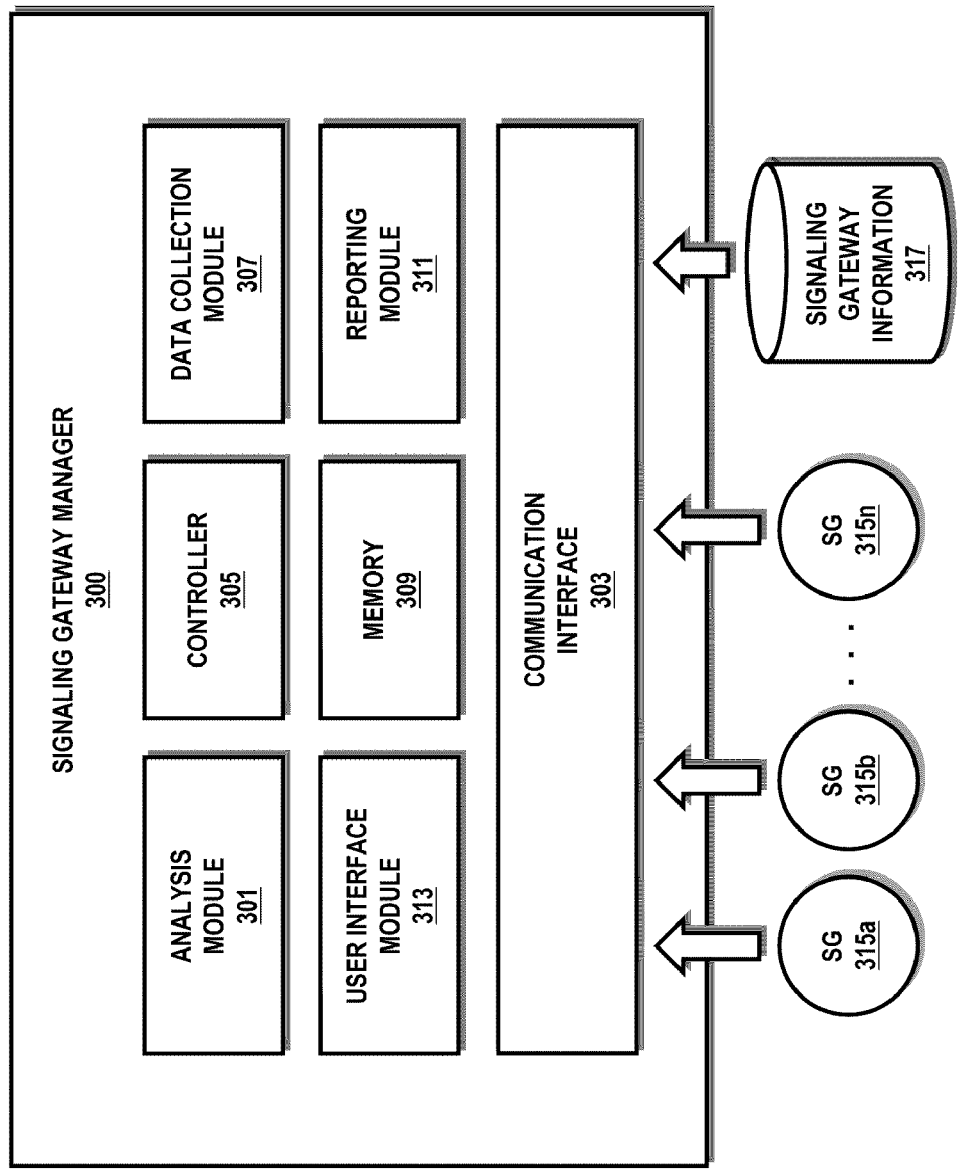
FIG. 3 is a diagram of a signaling gateway manager, according to an exemplary embodiment.

FIG. 3 is a diagram of a signaling gateway manager, according to an exemplary embodiment. Signaling gateway manager (or manager) 300 may comprise computing hardware (such as described with respect to FIG. 13), as well as include one or more components configured to execute the processes described herein for providing signaling gateway management functions (or tasks). In one implementation, manager 300 includes analysis module 301, communication interface 303, controller (or processor) 305, data collection module 307, memory 309, reporting module 311, and user interface module 313. Manager 300 may also communicate with one or more signaling gateways (e.g., signaling gateways 315a, 315b, . . . , 315n) and/or repositories, such as signaling gateway information repository 317. In this manner, manager 300 may also exchange information with one or more other network management functions, such as network management system 111. Users may be provided with access to manager 300 (or the features and functionality provided thereby) via client devices 123a-123n. It is also contemplated that manager 300 may embody many forms and include multiple and/or alternative components. For example, it is contemplated that the components of manager 300 may be combined, located in separate structures, or separate locations. Namely, a specific topology is not critical to embodiments of manager 300 or system 100.

Accordingly to exemplary embodiments, data collection module 307 is configured to automatically retrieve (or receive) signaling gateway information (or data) from a plurality of signaling gateways (SG) 315a-315n corresponding to, for example, network environment 103 and, thereby, related to one or more transmission paths, trunks, and/or channels. This signaling gateway information may be stored to any suitable memory or storage location of (or accessible to) manager 300, such as memory 309, signaling gateway information repository 317, etc. It is further noted that the signaling gateway information (or parts thereof) may be stored in relation to (or correlated with) one or more signaling gateway reference datums, such as with respect to signaling gateway link parameters, simple network management protocol (SNMP) parameters, block status trunk state parameters, virtual local area network (VLAN)-based switched port analysis (SPAN) parameters, internet service provider (ISP) port allocations (ISPPA) parameters, trunking gateway parameters, memory volume statistic parameters, and/or software stack configuration parameters. In this manner, data collection module 307 may execute automated aggregation of a wealth of signaling gateway information and may do so in one or more periodic, continual, and/or on-demand fashions. It is further noted that data collection module 307 may correlate signaling gateway information with the signaling gateways from which the information is retrieved or received. For instance, the signaling gateway information may be aggregated and stored in relation to common signaling gateway identifiers, provisioned region, etc.

Accordingly, analysis module 301 is configured to utilize the signaling gateway informational stored to, for instance, signaling gateway information repository 317 to perform one or more signaling gateway management tasks, such as VSPAN correlation and trending, signaling gateway configuration comparison, blocked circuit trending, simplexed socket identification, and signaling gateway memory volume analysis. VSPAN correlation and trending may be utilized to determine and trend operating states for one or more trunks of network environment 103. It is noted that the trending analysis may be executed over (or otherwise granulated according to) any suitable time period, such as one or more days, weeks, months, years, etc.

Analysis module 301 may also be configured to correlate the operating state and trending information with corresponding circuit identification codes (CIC) and/or access gateway socket identifiers relating to one or more transmission channels provisioned to corresponding trunks and the endpoints thereof. As such, analysis module 301 may be further configured to utilize these correlations to determine the operating states of trunks at various levels of abstraction, e.g., from a trunk-level perspective, a transmission channel-level perspective, and/or a socket-level perspective. Analysis module 301 may provide corresponding correlation and trending information to reporting module 311 that is configured to provide one or more alerts, notifications, or reports to network administrators and/or network management systems 111 at least including this operational state information, correlated CICs, socket identifiers, and simplexed socket states.

According to various other embodiments, analysis module 301 may utilize signaling gateway information to determine (or identify) signaling gateways that are paired (or otherwise grouped) for redundant operation. Analysis module 301 may compare the operating configuration parameters of "paired" signaling gateways, so as to locate (or otherwise identify) configuration parameter differences that would otherwise cause compatibility issues if the functioning of a correctly configured signaling gateway were to be replaced by an incorrectly configured signaling gateway. As such, manager 300 via, for instance, communication interface 303 and/or reporting module 311 may be configured to transmit identified configuration differences to network management system 111 for appropriate action, e.g., reconfiguration of incorrectly configured signaling gateways.

According to certain embodiments, manager 300 may embody one or more application servers accessible to client computing devices 123a-123n over one or more communication networks 121. In this manner, users (such as network administrators) can access manager 300 to monitor, evaluate, and receive reports and/or alerts identifying emerging or existing hardware or software issues and/or various potential operating configuration incompatibilities. It is noted that manager 300 may also proactively provide (e.g., push) such alerts or reports to network administrators (or network management systems 111). As such, manager 300 may provide a user interface, e.g., web portal or other networked application, to permit access to the features and functionality of manager 300 via client computing devices 123a-123n. According to certain embodiments, user interface module 313 may be configured for exchanging information between client computing devices 123a-123n and a web browser or other network-based application or system, such as a voice browser or interactive voice recognition system. Thus, user interface module 313 may be configured to execute one or more GUIs that are designed to provide users with one or more menus of options for performing or receiving alerts and reports resulting from signaling gateway management tasks. As previously mentioned, an exemplary GUI is described in more detail in accordance with FIG. 7.

In order to provide selective access to the features and functionality of manager 300, manager 300 may also include an authentication module (not illustrated) for authenticating (or authorizing) users to manager 300. It is contemplated that the authentication module may operate in concert with communication interface 303 and/or user interface module 313. That is, the authentication module may verify user provided credential information acquired via communication interface 303 and/or user interface module 313 against corresponding credential information stored to, for instance, memory 309. By way of example, the credential information may include "log on" information corresponding to a user name, password, coded key, or other unique identification parameter, such a personal identification number (PIN). In other instances, the credential information may include any one or combination of a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., bearer tag identifier, biometric code, voice print, etc. Network administrators may provide this information via client computing devices 123a-123n, such as by spoken utterances, dual-tone multi-frequency (DTMF) signals, packetized transmission, etc. It is contemplated that unobtrusive security may be provided by positively identifying and screening users based on one or more of the aforementioned credentials which may be seamlessly provided when client computing devices 123a-123n communicate with manager 300, such as a unique IP or MAC address. Other unobtrusive measures can be made available via voice prints, etc.

Additionally, manager 300 may include one or more controllers (or processors) 305 for effectuating the aforementioned features and functionality manager 300, as well as one or more memories 309 for permanent and/or temporary storage of one or more of the aforementioned parameters, information, signals, etc. In this manner, the features and functionalities of manager 300 may be executed by one or more controller(s) 305 and/or one or more memories 205, such as in conjunction with one or more of the various components of manager 300.

Figure 5:
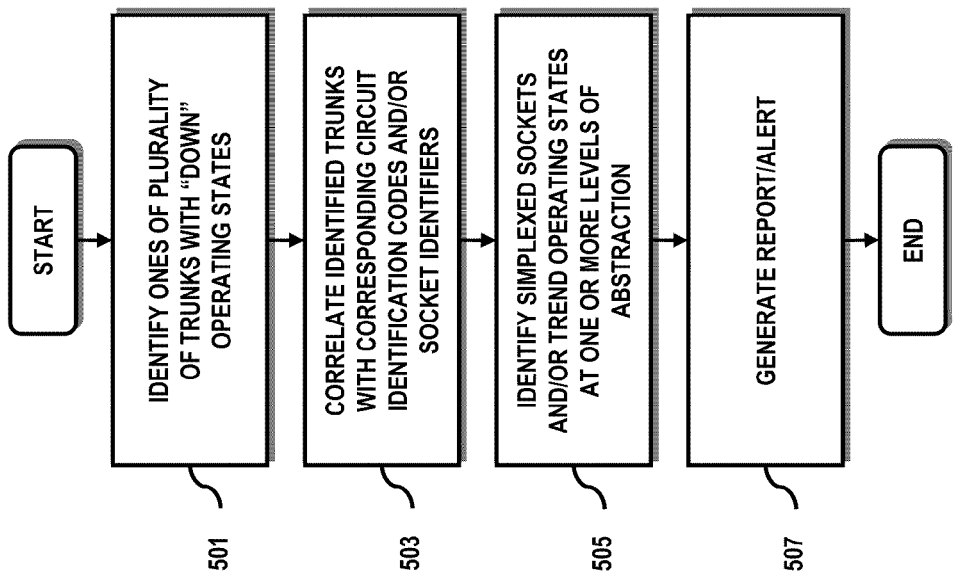
FIGS. 4 and 5 are flowcharts of processes for providing signaling virtual local area network switched port analysis correlation and trending, according to exemplary embodiments.
Figure 4:
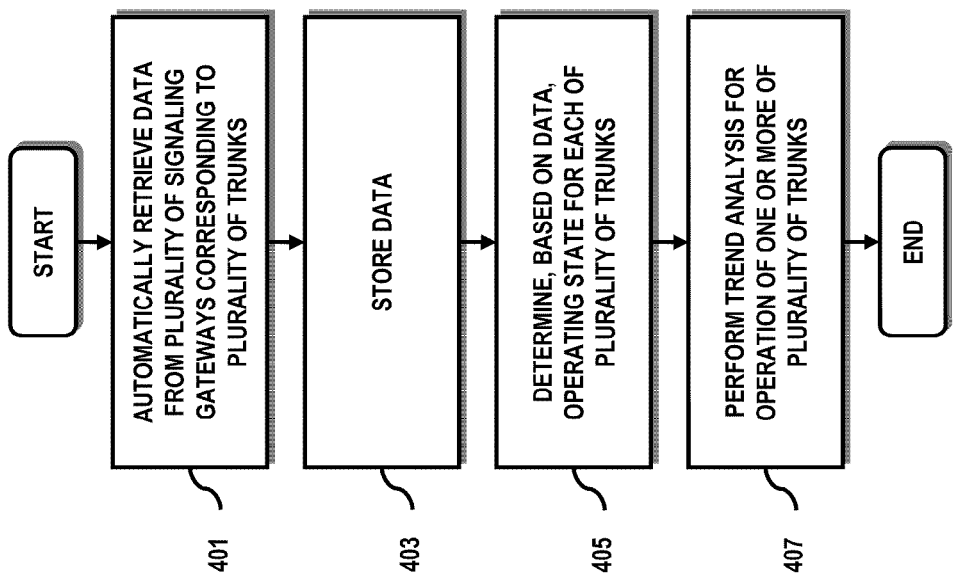

FIGS. 4 and 5 are flowcharts of processes for providing virtual local area network switched port correlation and trend analysis, according to exemplary embodiments. In particular, FIG. 4 provides an exemplary processor for performing trending analysis for the operation of one or more trunks corresponding to one or more signaling gateways of a telecommunications infrastructure, whereas FIG. 5 provides an exemplary process for generating a report and/or an alert based on trending, correlation, and/or state identification information. For illustrative purposes, these processes are described with reference to FIGS. 1 and 3. It is also noted that the steps of the processes may be performed in any suitable order, as well as combined or separated in any suitable manner.

At step 401, data collection module 307 of signaling gateway manager 300 automatically retrieves (or receives) signaling gateway information (or data) from a plurality of signaling gateways, e.g., signaling gateways 315a-315n, corresponding to a plurality of trunks of more regions (e.g., regions 117a-117n) or other divisions of a telecommunications network of a service provider, such as networking environment 103. In this manner, the signaling gateway information may relate to one or more of regions 117a-117n or the entire footprint of networking environment 103. In step 403, data collection module 307 stores the data to, for example, signaling information repository 317 according to one or more of the previously described correlating paradigms. It is noted, however, that the data may be stored to any other suitable memory or storage location of (or accessible to) manager 300, such as memory 309. Per step 405, analysis module 301 determines, based on the data, operating states for each of the plurality of trunks, which may be effectuated via the exchange of one or more signaling messages between networking nodes. At step 407, analysis module 301 trends the operating states of one or more of the plurality of trunks. For instance, analysis module 301 may trend the operating states of trunks exhibiting "down" operating states to, for instance, identify downtime of these trunks.

It is noted that analysis manager 301 may provide more specific operational state information by further correlating trunks with corresponding circuit identification codes (CIC) and/or access gateway socket identifiers. In this manner, analysis module 301, at step 501, may identify (utilizing the process of FIG. 4) ones of the plurality of trunks with "down" operating states. In step 503, identified trunks are correlated with corresponding CICs and/or access gateway socket identifiers, which may be extracted from signaling gateway information repository 317. As previously mentioned, CICs uniquely identify transmission channels provisioned to trunks, whereas access gateway socket identifiers uniquely identify IMT trunking end points of the trunks. Per step 505, analysis module 301 may parse the correlated data to identify simplexed sockets and/or trend operating states at one or more levels of abstraction, such as trending operating states at the socket-level, transmission channel-level, and/or trunk-level. Using the identification of simplexed sockets and/or trending information, reporting module 311 may generate, per step 507, one or more reports or alerts, which may be provided to network administrators at, for instance, client computing devices 123a-123n, or may be provided to network management system 111.

Figure 6:
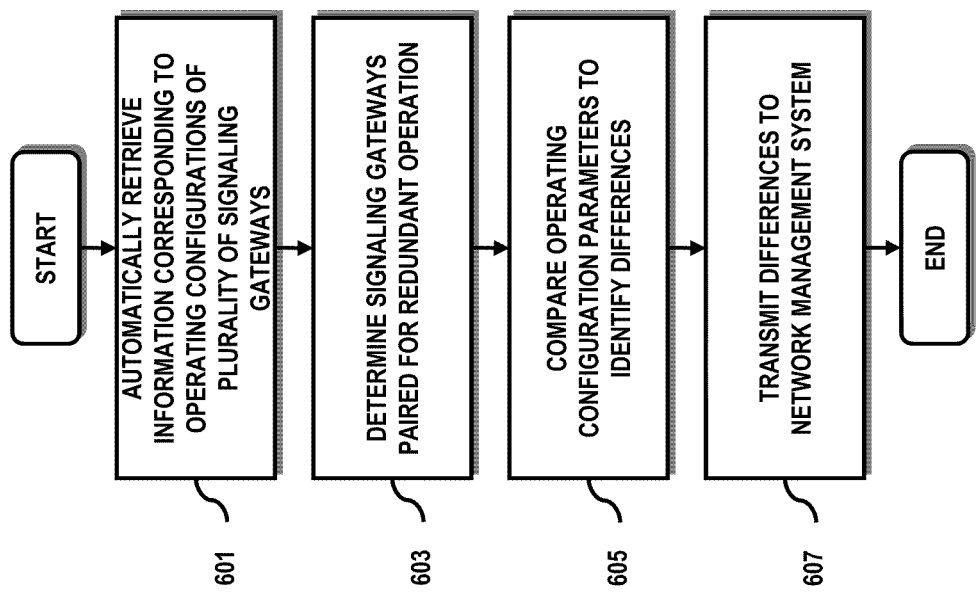
FIG. 6 is a flowchart of a process for providing signaling gateway configuration comparisons, according to an exemplary embodiment.

FIG. 6 is a flowchart of a process for providing signaling gateway configuration comparisons, according to an exemplary embodiment. For illustrative purposes, the process of FIG. 6 is described with reference to FIGS. 1 and 3. It is also noted that the steps of the process may be performed in any suitable order, as well as combined or separated in any suitable manner. In step 601, data collection module 307 automatically receives (or retrieves) information corresponding to operating configurations of a plurality of signaling gateways, such as signaling gateways 315a-315n of network environment 103. Based on the configuration information, analysis module 301 may determine (or otherwise identify) signaling gateways that are paired (or otherwise grouped) for redundant operation, per step 603. This determination may be effectuated via an ordered pair identifier included as a configuration parameter of the signaling gateways 315a-315n. At step 605, analysis module 301 may compare one or more operating configuration parameters of paired signaling gateways to identify differences between such parameters. In this manner, identified differences may be, for example, transmitted to network management system 111, in step 607. As such, network management system 111 may correct these differences, such as by reconfiguring the identified differences to a "correct" operational configuration parameter.

Figure 7:
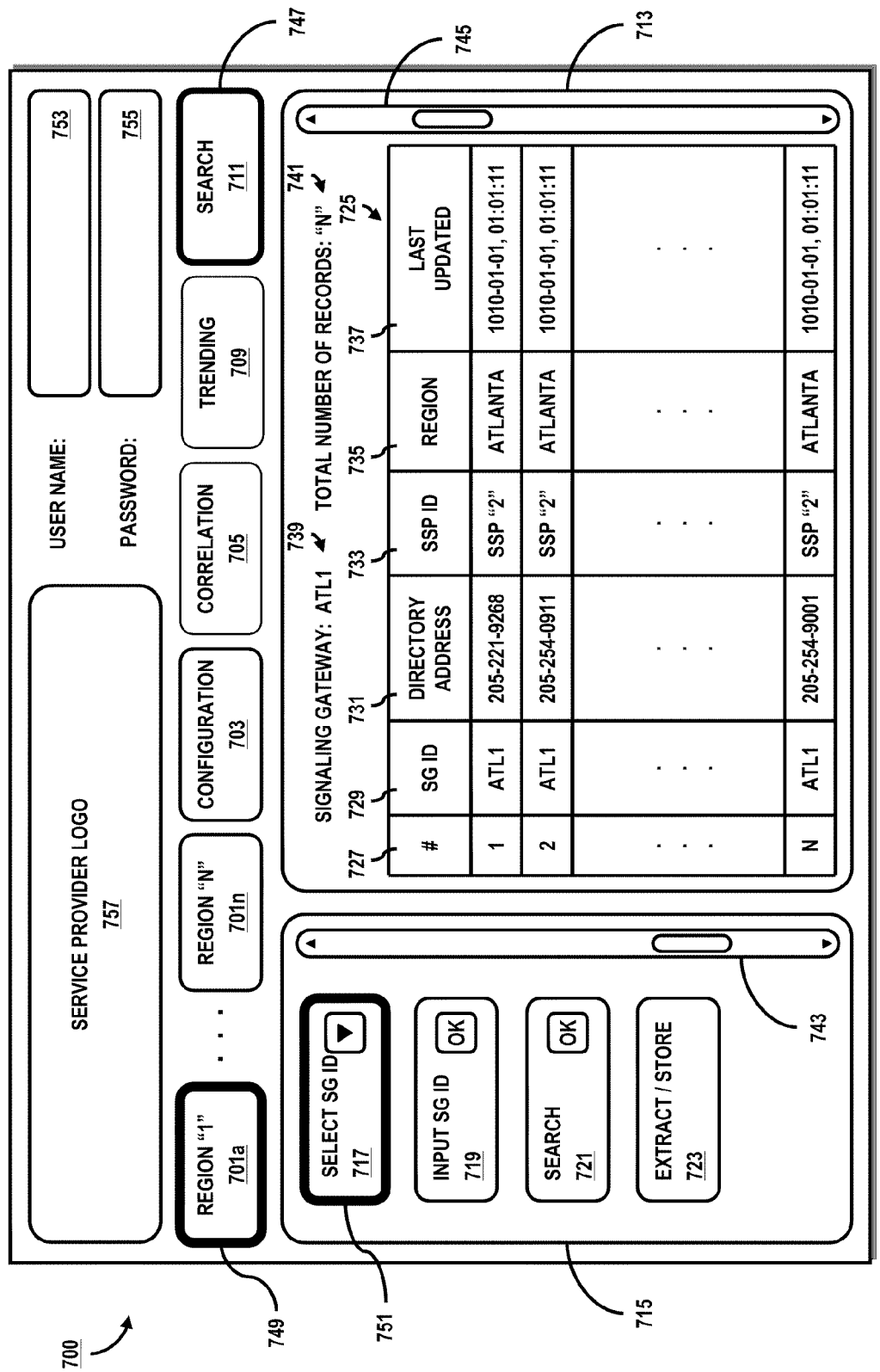
FIG. 7 is a graphical user interface configured to facilitate internet service provider port allocation querying, according to exemplary embodiment.
Figure 12:
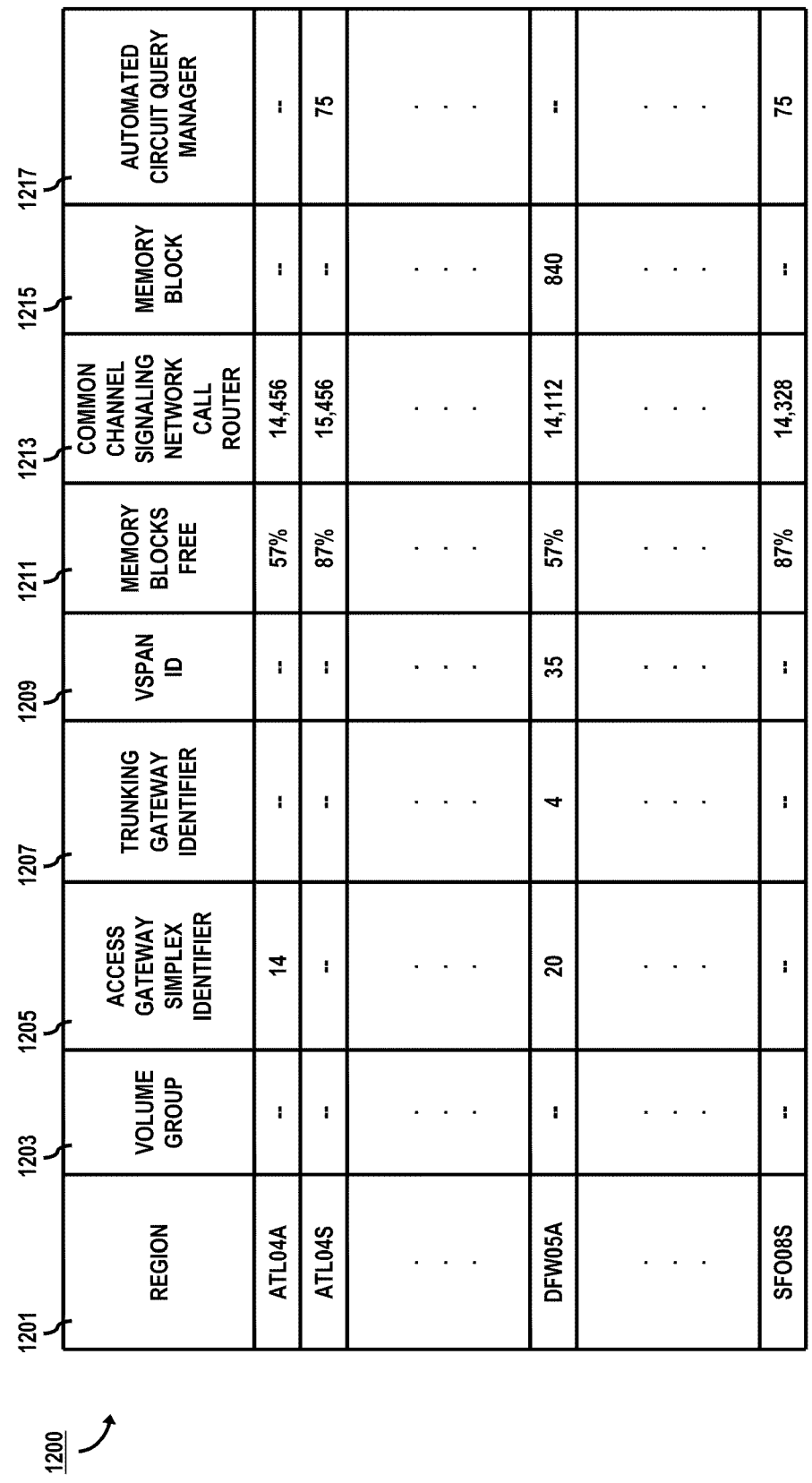

FIG. 7 is a graphical user interface configured to facilitate internet service provider port allocation querying, according to exemplary embodiment. In this example, it is assumed that GUI 700 is provided to a network administrator via, for instance, portal 125 and/or user interface module 313 of manager 300 for accessing one or more signaling gateway management tasks, such as ISPPA querying (or searching), which may be performed in relation to one or more signaling gateways (e.g., signaling gateways 105a-105n, 107a-107n, and 109a-109n) of one or more regions (e.g., regions 117a-117n) of network environment 103. Hence, GUI 700 includes a plurality of "tabs" (or interactive interface elements) 701a-701n corresponding to regions 117a-117n of network environment 103. A plurality of other tabs, e.g., "CONFIGURATION" tab 703, "CORRELATION" tab 705, "TRENDING" tab 707, and "SEARCH" tab 711, provide the network administrator with various signaling gateway management tasks carried out via, for instance, manager 300. Tab 703 provides access to signaling gateway configuration comparison features, tab 705 provides access to trunk, CIC, and socket correlation features. It is also noted that tab 709 provides access to operational state trending features. Accordingly, tab 711 provides access to directory address search features, which is more fully illustrated in the depicted embodiment.

In exemplary embodiments, tab 711 enables network administrators to extract, store, and search directory address information (e.g., telephone numbers) provision to one or more particular signaling gateways of one or more specified regions. Accordingly, selection of (or any other suitable interaction with) tab 711 toggles region 713 to an "active" display region for providing directory address information associated with one or more regions and/or one or more signaling gateways. For instance, selection of a particular one of tabs 701a-701n toggles "active" search region 713 between searching directory address information related to "REGION '1,'" REGION '2,'" . . . "REGION 'N.'" That is, selection of, for example, tab 701a toggles "active" search region 713 to present directory address information corresponding to "REGION '1.'" It may also be the case that interacting with tab 711 causes a feature (or control) region 715 to be populated with one or more "available" search features, such as a "SELECT SIGNALING GATEWAY IDENTIFIER" feature 717, an "INPUT SIGNALING GATEWAY IDENTIFIER" feature 719, a "SEARCH" feature 721, and a "EXTRACT/STORE" feature 723. In other embodiments, feature region 715 may include a navigation tree, an expandable table of contents, or, for example, a FlashMedia presentation of selectable entries, as well as other equivalent listings, menus, options, etc. The content of respective regions (e.g., regions 713 and 715) may be dynamically updated based on one or more selections of features 717-723.

Accordingly, interaction with feature 717 enables network administrators to select one or more signaling gateways by way of signaling gateway identifiers that the network administrators desire to query for directory address information. It is noted that the availability of selectable signaling gateway identifiers may be constrained by virtue of selecting tab 701a that, in exemplary embodiments, dynamically populates feature 717 (e.g., a pull down menu) with those signaling gateways corresponding to "REGION '1.'" Feature 719 enables network administrators to input one or more signaling gateway identifiers corresponding to those signaling gateways the network administrator wants to search. In this manner, feature 721 initiates the search based on the selections and/or inputs of tabs 701a-701n and features 717 and 719. According to particular embodiments, feature 721 may also enable network administrators to input directory addresses to search for amongst all or one or more of the signaling gateways of network environment 103. This is useful in those instances when the network service provider is unsure what signaling gateway and/or region a particular directory address is provisioned to. A feature 723 enables network service providers to extract directory addresses from signaling gateways identified via tabs 701a-701n and/or features 717 and 719 for storage at, for instance, signaling gateway information repository 119 or any other suitable memory or storage location of (or accessible to) manager 300.

As seen in display region 713, GUI 700 via, for instance, user interface module 313 and/or data collection module 307, generates a directory address listing 725 providing those directory addresses provisioned to signaling gateway "ATL1" of the "ATLANTA" region that, while not illustrated, was input to GUI 700 via tab 701a and feature 717. Directory address listing 725 provides a number of informational fields, such as a listing number field 727, a signaling gateway identifier field 729, a directory address field 731, a service switching point identifier field 733, a region field 735 and a last updated field 737. In order to provide feedback as to the global search parameters and results, display region 713 may also provide a field 739 for presenting network administrators with those signaling gateways being searched and a field 741 for presenting network administrators with a total number of records returned.

It is noted that one or more navigational elements, e.g., scrollbars 743 and 745, may be provided and configured to indicate the existence of additional information, entries, fields, etc., not displayed, but navigably available, as well as facilitate interface usability. Accordingly, the subscriber may browse to additional information, entries, fields, etc., via, for instance, an input interface of a suitable client computing device (e.g., client computing device 123b), e.g., a cursor control. One or more fixed focus states (e.g., borders 747, 749, and 751) and/or distinctive magnification features, e.g., color, brightness, bolding, font type, text size, etc., may be used to convey the signaling gateway management task being "currently" implemented, as well as those regions and/or search features being "currently" employed to search, extract, and/or store the directory address information of corresponding signaling gateways.

According to additional embodiments, GUI 700 may include various other regions, such as a user name region 753 and a password region 755 for enabling network administrators to "log on" and obtain access to the features and functionalities of GUI 700 and/or manager 300. In alternative embodiments, regions 753 and 755 may be configured to correspond to other associated authentication information. It is noted that a "WELCOME, USERNAME" message may be presented to authenticated users once sufficient authentication (or authorization) information is input to regions 753 and/or 755. Still further, GUI 700 may include a service provider logo region 757 to illustrate (or otherwise present) the logo of a service provider of network environment 103, as well as include other suitable (or equivalent) regions, such as an advertisement region (not shown), etc.

FIGS. 8-12 are illustrative signaling gateway management reports, according to exemplary embodiments. It is noted that the various reports of FIGS. 8-12 may accessed and/or presented to, for instance, network administrators via one or more GUI presentations of, for example, GUI 700. Reports 800 and 900 relate to respectively illustrative VSPAN correlation and trending results. In this manner, report 800 includes a number of correlated fields relating to the trunks corresponding to particular signaling gateways. These fields include a signaling gateway identifier field 801, a trunk operating state field 803, a VSPAN identifier field 805, a point code field 807, a trunking gateway identifier field 809, a trunk identifier field 811, a circuit identifier field 813, and a CIC start field 815. It is noted that information with report 800 may be utilized in the generation of report 900, which provides operational state trend information for trunks identified via VSPAN identifiers. In this manner, report 900 includes a VSPAN identifier field 901, one or more operational state fields 903 and 905, and a trend description field 907.

According to one embodiment, report 1000 relates to, for example, an illustrative signaling gateway configuration comparison result. Paired (or otherwise grouped) signaling gateways are identified via fields 1001 and 1003. Identified differences in configuration parameters of the signaling gateways are provided by field 1005.

Report 1100, however, relates to an illustrative blocking state result that identifies problematic CICs (or transmission channels) based on blocked circuit states. In this manner, report 1100 includes a point code field 1101, a VSPAN identifier field 1103, a circuit identifier field 1105, and a blocking state description field 1107.

Report 1200 may, in exemplary embodiments, provide signaling gateway management results for simplexed socket identification and memory volume analysis. In this manner, report 1200 includes a region field 1201, a volume group field 1203, an access gateway simplex identifier field 1205, a trunking gateway identifier field 1207, a VSPAN identifier field 1209, a memory blocks free field 1211, a common channel signaling network call router field 1213, a memory block field 1215, and an automated circuit query manager field 1217. It is noted that the combination of fields 1203 and 1211 provide the aggregated disk volume analysis result.

The above arrangement and processes, according to certain embodiments, advantageously provide management of signaling gateways in an efficient and effective way, in part, by automating the monitoring and evaluation of performance of these gateways.

The processes described herein for providing signaling gateway management may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
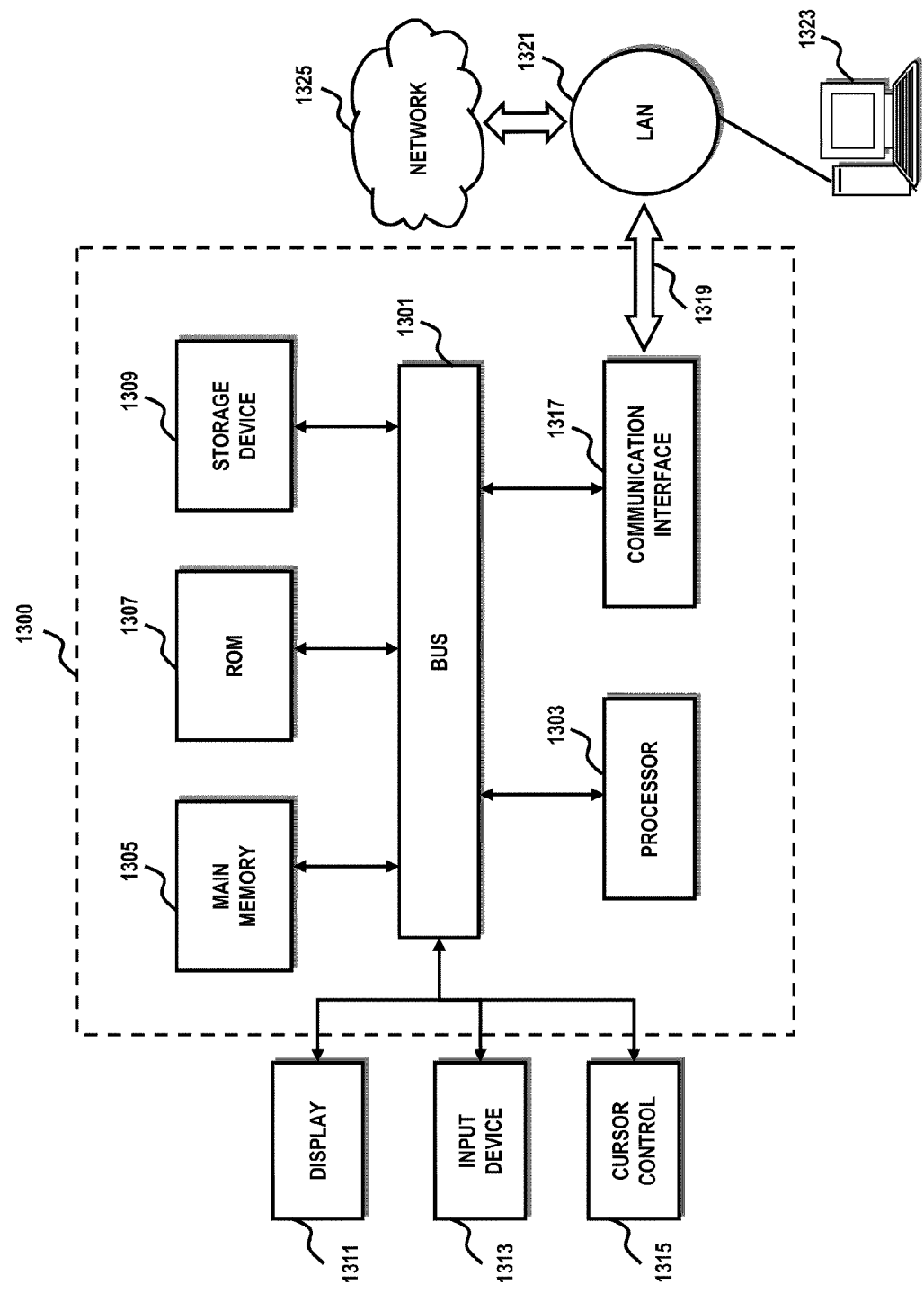
FIG. 13 is a diagram of a computer system that can be used to implement various exemplary embodiments.

FIG. 13 illustrates computing hardware (e.g., computer system) 1300 upon which exemplary embodiments can be implemented. The computer system 1300 includes a bus 1301 or other communication mechanism for communicating information and a processor 1303 coupled to the bus 1301 for processing information. The computer system 1300 also includes main memory 1305, such as a random access memory (RAM) or other dynamic storage device, coupled to the bus 1301 for storing information and instructions to be executed by the processor 1303. Main memory 1305 can also be used for storing temporary variables or other intermediate information during execution of instructions by the processor 1303. The computer system 1300 may further include a read only memory (ROM) 1307 or other static storage device coupled to the bus 1301 for storing static information and instructions for the processor 1303. A storage device 1309, such as a magnetic disk or optical disk, is coupled to the bus 1301 for persistently storing information and instructions.

The computer system 1300 may be coupled via the bus 1301 to a display 1311, such as a cathode ray tube (CRT), liquid crystal display, active matrix display, or plasma display, for displaying information to a computer user. An input device 1313, such as a keyboard including alphanumeric and other keys, is coupled to the bus 1301 for communicating information and command selections to the processor 1303. Another type of user input device is a cursor control 1315, such as a mouse, a trackball, or cursor direction keys, for communicating direction information and command selections to the processor 1303 and for controlling cursor movement on the display 1311.

According to an exemplary embodiment, the processes described herein are performed by the computer system 1300, in response to the processor 1303 executing an arrangement of instructions contained in main memory 1305. Such instructions can be read into main memory 1305 from another computer-readable medium, such as the storage device 1309. Execution of the arrangement of instructions contained in main memory 1305 causes the processor 1303 to perform the process steps described herein. One or more processors in a multi-processing arrangement may also be employed to execute the instructions contained in main memory 1305. In alternative embodiments, hard-wired circuitry may be used in place of or in combination with software instructions to implement exemplary embodiments. Thus, exemplary embodiments are not limited to any specific combination of hardware circuitry and software.

The computer system 1300 also includes a communication interface 1317 coupled to bus 1301. The communication interface 1317 provides a two-way data communication coupling to a network link 1319 connected to a local network 1321. For example, the communication interface 1317 may be a digital subscriber line (DSL) card or modem, an integrated services digital network (ISDN) card, a cable modem, a telephone modem, or any other communication interface to provide a data communication connection to a corresponding type of communication line. As another example, communication interface 1317 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1317 sends and receives electrical, electromagnetic, or optical signals that carry digital data streams representing various types of information. Further, the communication interface 1317 can include peripheral interface devices, such as a Universal Serial Bus (USB) interface, a PCMCIA (Personal Computer Memory Card International Association) interface, etc. Although a single communication interface 1317 is depicted in FIG. 13, multiple communication interfaces can also be employed.

The network link 1319 typically provides data communication through one or more networks to other data devices. For example, the network link 1319 may provide a connection through local network 1321 to a host computer 1323, which has connectivity to a network 1325 (e.g. a wide area network (WAN) or the global packet data communication network now commonly referred to as the "Internet") or to data equipment operated by a service provider. The local network 1321 and the network 1325 both use electrical, electromagnetic, or optical signals to convey information and instructions. The signals through the various networks and the signals on the network link 1319 and through the communication interface 1317, which communicate digital data with the computer system 1300, are exemplary forms of carrier waves bearing the information and instructions.

The computer system 1300 can send messages and receive data, including program code, through the network(s), the network link 1319, and the communication interface 1317. In the Internet example, a server (not shown) might transmit requested code belonging to an application program for implementing an exemplary embodiment through the network 1325, the local network 1321 and the communication interface 1317. The processor 1303 may execute the transmitted code while being received and/or store the code in the storage device 1309, or other non-volatile storage for later execution. In this manner, the computer system 1300 may obtain application code in the form of a carrier wave.

The term "computer-readable medium" as used herein refers to any medium that participates in providing instructions to the processor 1303 for execution. Such a medium may take many forms, including but not limited to non-volatile media, volatile media, and transmission media. Non-volatile media include, for example, optical or magnetic disks, such as the storage device 1309. Volatile media include dynamic memory, such as main memory 1305. Transmission media include coaxial cables, copper wire and fiber optics, including the wires that comprise the bus 1301. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:

retrieving, automatically, data from a plurality of signaling gateways corresponding to a plurality of trunks of a telecommunications network, wherein each signaling gateway is configured to convert circuit-switched signaling to packet-switched signaling;

storing the data;

determining, based on the data, an operating state for each of the plurality of trunks to perform trending analysis for the operation of one or more of the plurality of trunks;

identifying ones of the plurality of trunks with down operating states;

trending the operating states of the identified trunks;

generating a report, based on the trends, to at least specify downtime of the identified trunks; and correlating the identified trunks with corresponding circuit identification codes; and generating the report to further include the corresponding circuit identifications codes of the identified trunks.

2. A method according to claim 1, further comprising:

correlating the corresponding circuit identification codes with corresponding access gateway socket identifiers; and generating the report to further include the corresponding access gateway socket identifiers.

3. A method comprising:

retrieving, automatically, data from a plurality of signaling gateways corresponding to a plurality of trunks of a telecommunications network, wherein each signaling gateway is configured to convert circuit-switched signaling to packet-switched signaling;

storing the data; determining, based on the data, an operating state for each of the plurality of trunks to perform trending analysis for the operation of one or more of the plurality of trunks;

determining, based on the data, an operating state for each of a plurality of sockets corresponding to the plurality of trunks;

identifying, based on the operating states, ones of the plurality of sockets that are in a simplexed state; and generating a report to further include identified sockets.

4. A method comprising:

retrieving, automatically, data from a plurality of signaling gateways corresponding to a plurality of trunks of a telecommunications network, wherein each signaling gateway is configured to convert circuit-switched signaling to packet-switched signaling;

storing the data;

determining, based on the data, an operating state for each of the plurality of trunks to perform trending analysis for the operation of one or more of the plurality of trunks;

retrieving, automatically, information corresponding to operating configurations of the plurality of signaling gateways, wherein the information relates to one or more configuration parameters of the plurality of signaling gateways;

determining ones of the plurality of signaling gateways that are grouped for redundant operation; and comparing operating configurations of grouped signaling gateways to identify differences in configuration parameters, wherein identified differences are transmitted to a network management system.

5. An apparatus comprising:

a communication interface configured to automatically retrieve data from a plurality of signaling gateways corresponding to a plurality of trunks of a telecommunications network, wherein each signaling gateway is configured to convert circuit-switched signaling to packet-switched signaling; and a processor configured to cause the data to be stored and to determine, based on the data, an operating state for each of the plurality of trunks to perform trending analysis for the operation of one or more of the plurality of trunks;

wherein the processor is further configured to identify ones of the plurality of trunks with down operating states, trend the operating states of the identified trunks, and generate a report, based on the trends, to at least specify downtime of the identified trunks; and wherein the processor is further configured to correlate the identified trunks with corresponding circuit identification codes and generate the report to further include the corresponding circuit identification codes of the identified trunks.

6. An apparatus according to claim 5, wherein the processor is further configured to correlate the corresponding circuit identification codes with corresponding access gateway socket identifiers and generate the report to further include the corresponding access gateway socket identifiers.

7. An apparatus comprising:
a communication interface configured to automatically retrieve data from a plurality of signaling gateways corresponding to a plurality of trunks of a telecommunications network, wherein each signaling gateway is configured to convert circuit-switched signaling to packet-switched signaling; and
a processor configured to cause the data to be stored and to determine, based on the data, an operating state for each of the plurality of trunks to perform trending analysis for the operation of one or more of the plurality of trunks;
wherein the processor is further configured to determine, based on the data, an operating state for each of a plurality of sockets corresponding to the plurality of trunks, identify, based on the operating states, ones of the plurality of sockets that are in a simplexed state, and to generate a report to include identified sockets.

8. An apparatus comprising:
a communication interface configured to automatically retrieve data from a plurality of signaling gateways corresponding to a plurality of trunks of a telecommunications network, wherein each signaling gateway is configured to convert circuit-switched signaling to packet-switched signaling; and
a processor configured to cause the data to be stored and to determine, based on the data, an operating state for each of the plurality of trunks to perform trending analysis for the operation of one or more of the plurality of trunks
wherein the communication interface is further configured to automatically retrieve information corresponding to operating configurations of the plurality of signaling gateways, the information relating to one or more configuration parameters of the plurality of signaling gateways, and the processor is further configured to determine ones of the plurality of signaling gateways that are grouped for redundant operation, and compare operating configurations of grouped signaling gateways to identify differences in configuration parameters, wherein identified differences are transmitted to a network management system.

* * * * *